United States Patent
Weber et al.

(10) Patent No.: US 7,671,127 B2
(45) Date of Patent: Mar. 2, 2010

(54) IMPACT-MODIFIED THERMOPLASTIC MOLDING COMPOSITIONS BASED ON VINYL AROMATIC COPOLYMERS AND POLYAMIDE

(75) Inventors: Martin Weber, Maikammer (DE); Frank Rittig, Mannheim (DE); Werner Haensel, Lingenfeld (DE); Walter Heckmann, Weinheim (DE); Hans Hönl, Obersülzen (DE); Peter Ittemann, Lampertheim (DE); Bangaru Sampath, Bayreuth (DE)

(73) Assignee: BASF SE, Lugwigshafen (DE)

( * ) Notice: Subject to any disclaimer, the term of this patent is extended or adjusted under 35 U.S.C. 154(b) by 357 days.

(21) Appl. No.: 11/721,261

(22) PCT Filed: Dec. 3, 2005

(86) PCT No.: PCT/EP2005/012981

§ 371 (c)(1), (2), (4) Date: Jun. 8, 2007

(87) PCT Pub. No.: WO2006/061158

PCT Pub. Date: Jun. 15, 2006

(65) Prior Publication Data

US 2009/0239990 A1   Sep. 24, 2009

(30) Foreign Application Priority Data

Dec. 8, 2004   (DE) ................ 10 2004 059 241

(51) Int. Cl.
C08L 51/04   (2006.01)
(52) U.S. Cl. ................ 524/504; 525/66; 525/77
(58) Field of Classification Search ............ 524/504; 525/66, 78, 77
See application file for complete search history.

(56) References Cited

U.S. PATENT DOCUMENTS

| | | | |
|---|---|---|---|
| 4,713,415 A * | 12/1987 | Lavengood et al. | ............ 525/66 |
| 5,288,799 A | 2/1994 | Schmid et al. | |
| 5,728,800 A | 3/1998 | Gottschalk et al. | |
| 6,218,467 B1 | 4/2001 | Wicker et al. | |
| 6,800,690 B2 | 10/2004 | Rajagopalan et al. | |
| 7,026,394 B2 * | 4/2006 | Park et al. | ............ 525/66 |
| 2003/0078348 A1 | 4/2003 | Rajagopalan et al. | |

FOREIGN PATENT DOCUMENTS

| | | |
|---|---|---|
| DE | 44 35 699 | 4/1996 |
| EP | 0 202 214 A2 | 11/1986 |
| EP | 0 722 986 | 7/1996 |
| WO | WO-2004/083303 | 9/2004 |

OTHER PUBLICATIONS

International Search Report No. PCT/EP2005/012981 dated Mar. 3, 2006, 6 pages.
International Preliminary Report on Patentability of International Application No. PCT/EP2005/012981 Issued on Jan. 4, 2007.

* cited by examiner

Primary Examiner—Peter Szekely
(74) Attorney, Agent, or Firm—Connolly Bove Lodge & Hutz LLP

(57) ABSTRACT

The invention relates to thermoplastic molding compositions, comprising
A) from 35 to 95% by weight of at least one graft copolymer A), which is obtainable via reaction of
   A1) from 5 to 95% by weight of a polymer A1), which is obtained from at least one dicarboxylic anhydride a11) and from at least one vinylaromatic comonomer a12), and
   A2) from 5 to 95% by weight of a polyamide A2),
B) from 5 to 40% by weight of at least one ungrafted or grafted, non-particulate rubber without core-shell structure B), which has functional groups which can react with the end groups of component A),
C) from 0 to 50% by weight of at least one particulate or fibrous filler or particulate or fibrous reinforcing material C),
D) from 0 to 60% by weight of at least one copolymer D) composed of vinyl aromatic monomers d1) and of comonomers d2), and
E) from 0 to 40% by weight of at least one other additive E), where the entirety of components A) to E) gives 100% by weight,
and also to processes for preparation of the thermoplastic molding compositions, to the use of the thermoplastic molding compositions for production of moldings, of foils, of fibers, or of foams, and finally to the moldings, foils, fibers, and foams obtainable from the thermoplastic molding compositions.

16 Claims, No Drawings

IMPACT-MODIFIED THERMOPLASTIC MOLDING COMPOSITIONS BASED ON VINYL AROMATIC COPOLYMERS AND POLYAMIDE

CROSS REFERENCE TO RELATED APPLICATION

The present application is a National Stage application of PCT/EP2005/012981, filed Dec. 3, 2005, which claims priority from German Patent Application No. DE 102004059241.1, filed Dec. 8, 2004.

DESCRIPTION

The invention relates to thermoplastic molding compositions, comprising
A) from 35 to 95% by weight of at least on graft copolymer A), which is obtainable via reaction of
   A1) from 5 to 95% by weight of a polymer A1), which is obtained from at least one dicarboxylic anhydride a11) and from at least one vinylaromatic comonomer a12), and
   A2) from 5 to 95% by weight of a polyamide a2),
B) from 5 to 40% by weight of at least one ungrafted or grafted, non-particulate rubbeer without core-shell structure B), which has functional groups which can react with the end groups of component A),
C) from 0 to 50% by weight of a least one particulate or fibrous filler or particulate or fibrous reinforcing material C),
D) from 0 to 60% by weight of at least one copolymer D) composed of vinyl aromatic monomers d1) and of comonomers d2), and
E) from 0 to 40% by weight of at least one other additive E), where the entirety of components A) to E) gives 100% by weight.

The invention further relates to a process for production of the thermoplastic molding compositions, to the use of the thermoplastic molding compositions for production of moldings, of foils, of fibers, or of foams, and finally to the moldings, foils, fibers, and foams obtainable from the thermoplastic molding compositions.

Blends based on vinylaromatic copolymers and polyamide are known. These blends generally have very poor toughness values, due to incompatibility between the vinylaromatic copolymers and polymers. By way of example, binary mixtures composed of styrene-acrylonitrile copolymers("SAN") and polyamide have very little industrial use, because their mechanical properties are poor.

It is also known that the mechanical properties, in particular the impact resistances, of blends based on vinylaromatic copolymers and polyamide can be improved by admixing polymers which have functional groups which can react with the end groups of the polyamide. These polymers have compatibilizing action between the polyamide phase and the phase formed by the vinylaromatic copolymers.

Blends of the last-mentioned type composed of acrylonitrile-butadiene-styrene copolymers ("ABS") and polyamide, in which, by way of example, the compatibilizers used comprise copolymers composed of styrene, acrylonitrile, and maleic anhydride, or styrene, methyl methacrylate, and maleic anhydride are known inter alia from EP-A 202 214 and WO 98/27157.

WO 04/83303 discloses molding compositions composed of certain vinylaromatic copolymers, of polyamide, and of a graft copolymer, the graft copolymer being obtainable in a separate step via reaction of, by way of example, a styrene-acrylonitrile-maleic anhydride copolymer with a portion of the polyamide. The vinylaromatic copolymers disclosed in these molding compositions comprise matrix polymers impact-modified with particulate rubbers, in particular ABS.

Although in particular the last-mentioned known molding compositions generally have a good property profile, further improvement of certain mechanical properties is desirable.

It was therefore an object to provide impact-modified thermoplastic molding compositions based on vinylaromatic copolymers and polyamide with improved mechanical properties, in particular with improved notched impact resistance and fracture energy or stiffness.

Accordingly, the thermoplastic molding compositions defined at the outset have been found, as have their preparation and the moldings, foils, fibers, and foams composed of the molding compositions.

Preferred embodiments of the invention are described below.

The molding compositions comprise
A) from 35 to 95% by weight, preferably from 40 to 90% by weight, and particularly preferably from 45 to 85% by weight, of component A),
B) from 5 to 40% by weight, preferably from 10 to 30% by weight, and particularly preferably from 15 to 25% by weight, of component B),
C) from 0 to 50% by weight, preferably from 0 to 40% by weight, and particularly preferably from 0 to 30% by weight, of component C),
D) from 0 to 60% by weight, preferably from 0 to 50% by weight, and particularly preferably from 0 to 40% by weight, of component D), and
E) from 0 to 40% by weight, preferably from 0 to 30% by weight, and particularly preferably from 0 to 20% by weight, of component E), where the amounts within the above ranges have been selected in such a way that the entirety of components A) to E) gives a total of 100% by weight. Components C), D), and E) are optional.

Component A): Graft Copolymer

Component A) is a graft copolymer, obtainable via reaction of a polymer A1), which is obtainable from a dicarboxylic anhydride a11) and from vinylaromatic comonomers a12), and of a polyamide A2).

It is likely that the graft copolymer A) comprises repeat units deriving from the polymer A1) and repeat units deriving from the polyamides A2). There is probably a backbone composed of polymer A1) to which polyamide side chains have been bonded. Components A1) and A2) are described first below, followed by details of their reaction to give A).

Component A1): Polymer Composed of Dicarboxylic Anhydride and Comonomer

The polymer A1) is obtained via reaction of a dicarboxylic anhydride a11) with vinylaromatic comonomers a12). The term comonomers here does not mean that these monomers are subordinate in quantitative terms. Actually, in many instances the vinylaromatic comonomers a12) are the main component(s), based on the polymer A1), i.e. in many instances the polymer A1) comprises more vinylaromatic comonomers a12) than dicarboxylic anhydride a11).

The polymer a1) preferably comprises
a11) from 0.01 to 30% by weight, preferably from 0.1 to 20% by weight, and in particular from 0.5 to 10% by weight, of the dicarboxylic anhydride a11), and a12) from 70 to 99.99% by weight, preferably from 80 to 99.9% by weight, and in particular from 90 to 99.5% by weight, of the vinylaromatic comonomers a12).

Particularly suitable dicarboxylic anhydrides a11) are $\alpha,\beta$-unsaturated dicarboxylic anhydrides. Preference is given to maleic anhydride ("MA"), methylmaleic anhydride, and itaconic anhydride. MA is particularly preferred. It is also possible to use mixtures of various dicarboxylic anhydrides.

Suitable vinylaromatic comonomers a12) are styrene, styrenes substituted on the ring with $C_{1-10}$-alkyl radicals, e.g. $\alpha$-methylstyrene, p-methylstyrene, ethylstyrene, tert-butylstyrene, and also 1,2-diphenylethylene, 1,1-diphenylethylene, the vinyinaphthalenes, or a mixture of these. Preference is given to styrene, $\alpha$-methylstyrene, p-methylstyrene, and vinyinaphthalene, and particular preference is given to styrene and $\alpha$-methylstyrene.

In another embodiment of the invention, the polymer A1) comprises not only the dicarboxylic anhydride a11) and the vinylaromatic comonomers a12) but also other comonomers a13).

These polymers A1) which comprise other comonomers a13) particularly preferably comprise
a11) from 0.01 to 30% by weight, preferably from 0.1 to 20% by weight, and in particular from 0.5 to 10% by weight, of the dicarboxylic anhydrides a11),
a12) from 10 to 92.99% by weight, preferably from 40 to 89.9% by weight, and in particular from 42 to 85.5% by weight, of the vinylaromatic comonomers a12), and
a13) from 7 to 50% by weight, preferably from 10 to 40% by weight, and in particular from 14 to 38% by weight, of the other comonomers a13), where the amounts within the above ranges are selected in such a way that the entirety of the components a11), a12), and a13) gives a total of 100% by weight.

Examples of other suitable comonomers a13) are:

Nitriles, such as acrylonitrile or methacrylonitrile, $C_1$-$C_{12}$-alkyl esters of acrylic acid or of methacrylic acid; preferred acrylates are ethyl acrylate and the methacrylates; it is also possible to use mixtures of various alkyl acrylates whose alkyl radical differs; a particularly suitable alkyl methacrylate is methyl methacrylate;

conjugated dienes, such as butadiene, isoprene, and chloroprene, and also norbornene and dicyclopentadiene, glycidyl ester, e.g. glycidyl acrylate and glycidyl methacrylate, N-substituted maleimides, such as N-methyl-, N-butyl-, N-phenyl-, and N-cyclo-hexylmaleimide, acrylic acid, methacrylic acid, and also dicarboxylic acids, such as maleic acid, fumaric acid, and itaconic acid, nitrogen-functional monomers, such as dimethylaminoethyl acrylate, diethylaminoethyl acrylate, vinylimidazole, vinylpyrrolidone, vinylcaprolactam, vinylcarbazole, vinylaniline, acrylamide, and methacrylamide, aromatic and araliphatic esters of acrylic acid and methacrylic acid, e.g. phenyl acrylate, phenyl methacrylate, benzyl acrylate, benzyl methacrylate, 2-phenylethyl acrylate, 2-phenylethyl methacrylate, 2-phenoxyethyl acrylate, and 2-phenoxyethyl methacrylate, unsaturated ethers, such as vinyl methyl ether, and also mixtures of the abovementioned monomers.

Among these, preferred other comonomers a13) are: acrylonitrile, methacrylonitrile, acrylamide, methacrylamide, acrylic acid compounds and methacrylic acid compounds, e.g. methyl methacrylate, N-phenylmaleimide, and N-alkyl-maleimides, such as N-methylmaleimide, N-butylmaleimide, N-isopropylmaleimide, and N-cyclohexylmaleimide, or a mixture of these.

Particularly preferred other comonomers a13) are: acrylonitrile, methacrylonitrile, methyl methacrylate, N-phenylmaleimide, and the N-alkylmaleimides. Acrylonitrile is very particularly preferred.

Particularly preferred polymers A1) are:
styrene-MA copolymers,
styrene-$\alpha$-methylstyrene-MA terpolymers,
styrene-acrylonitrile-MA terpolymers,
styrene-N-phenylmaleimide-MA terpolymers.

The polymers A1) are prepared in a manner known per se, for example via bulk, solution, emulsion, suspension, or precipitation polymerization, and to this end concomitant use may be made of conventional polymerization auxiliaries (e.g. initiators, emulsifiers, suspending agents, molecular weight regulators, etc.).

Preparation via bulk polymerization or solution polymerization is particularly preferred. By way of example, the monomers, such as styrene, acrylonitrile, and MA, may be dissolved in a suitable solvent, such as methyl ethyl ketone, polymerization initiator (see next paragraph) may be added if appropriate, and the polymerization may be carried out at an elevated temperature. The solvent and the unreacted monomers are then removed in a conventional manner.

The polymerization process may be initiated thermally or via free-radical polymerization initiators, such as azo compounds, e.g. 2,2'-azobis(isobutyronitrile), redox systems based on tertiary amines and on peroxides, or preferably peroxides, such as dilauroyl peroxide, dibenzoyl peroxide, or 2,2-bis(tert-butylperoxy)butane. Peroxide mixtures, e.g. composed of dilauroyl peroxide and 2,2-bis(tert-butylperoxy)butane, also have good suitability.

Conventional molecular weight regulators, such as n-dodecyl mercaptan or 2-ethylhexyl thioglycolate, can be used to adjust molecular weight.

The weight-average molar mass $M_w$ of the polymers is generally from 10 000 to 1 000 000 g/mol, preferably from 50 000 to 500 000 g/mol, and in particular from 70 000 to 200 000 g/mol.

Component A2): Polyamide

A suitable polyamide A2) is in principle any of the known polyamides. By way of example, use may be made of polyamides having an aliphatic, semicrystalline or semiaromatic, or else amorphous structure of any type and their blends, including polyetheramides, such as polyether-block-amides.

Semicrystalline or amorphous resins with a molecular weight (weight-average) of at least 5000, e.g. those described in the U.S. Pat. specification Nos. 2,071,250, 2,071,251, 2,130,523, 2,130,948, 2,241,322, 2,312,966, 2,512,606 and 3,393,210 are preferred. Examples of these are polyamides derived from lactams having from 7 to 13 ring members, e.g. polycaprolactam, polycaprylolactam, and polylaurolactam, and also polyamides obtained via reaction of dicarboxylic acids with diamines.

Dicarboxylic acids which may be used are alkanedicarboxylic acids having from 6 to 12, in particular from 6 to 10, carbon atoms, and aromatic dicarboxylic acids. Acids which may be mentioned here are adipic acid, azelaic acid, sebacic acid, do-decanedioic acid (=decanedicarboxylic acid) and terephthalic and/or isophthalic acid.

Particularly suitable diamines are alkanediamines having from 6 to 12, in particular from 6 to 8, carbon atoms, and also m-xylylenediamine, di(4-aminophenyl)methane, di(4-aminocyclohexyl)methane, di(4-amino-3-methylcyclohexyl)

methane, iso-phoronediamine, 1,5-diamino-2-methylpentane, 2,2-di(4-aminophenyl)propane, or 2,2-di(4-aminocyclohexyl)propane.

Preferred polyamides are polyhexamethyleneadipamide (PA 66) and polyhexamethyl-enesebacamide (PA 610), polycaprolactam (PA 6), and also nylon-6/6,6 copolyamides, in particular having a proportion of from 5 to 95% by weight of caprolactam units. PA 6, PA 66, and nylon-6/6,6 copolyamides are particularly preferred; PA 6 is very particularly preferred.

Other suitable polyamides are obtainable from ω-aminoalkyl nitriles, e.g. aminocapronitrile (PA 6) and adipodinitrile with hexamethylenediamine (PA 66) via what is known as direct polymerization in the presence of water, for example as described in DE-A 10313681, EP-A 1198491 and EP-A 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other examples are polyamides obtainable via copolymerization of two or more of the abovementioned monomers, and mixtures of two or more polyamides in any desired mixing ratio.

Other polyamides which have proven particularly advantageous are semiaromatic co-polyamides, such as PA 6/6T and PA 66/6T, where the triamine content of these is less than 0.5% by weight, preferably less than 0.3% by weight (see EP-A 299 444). The processes described in EP-A 129 195 and 129 196 can be used to prepare the semi-aromatic copolyamides with low triamine content.

The following list, which is not comprehensive, comprises the polyamides A2 mentioned and other polyamides A2) for the purposes of the invention, and the monomers present:

| AB polymers: | |
|---|---|
| PA 6 | ε-Caprolactam |
| PA 7 | Ethanolactam |
| PA 8 | Caprylolactam |
| PA 9 | 9-Aminopelargonic acid |
| PA 11 | 11-Aminoundecanoic acid |
| PA 12 | Laurolactam |
| AA/BB polymers: | |
| PA 46 | Tetramethylenediamine, adipic acid |
| PA 66 | Hexamethylenediamine, adipic acid |
| PA 69 | Hexamethylenediamine, azelaic acid |
| PA 610 | Hexamethylenediamine, sebacic acid |
| PA 612 | Hexamethylenediamine, decanedicarboxylic acid |
| PA 613 | Hexamethylenediamine, undecanedicarboxylic acid |
| PA 1212 | 1,12-Dodecanediamine, decanedicarboxylic acid |
| PA 1313 | 1,13-Diaminotridecane, undecanedicarboxylic acid |
| PA 6T | Hexamethylenediamine, terephthalic acid |
| PA MXD6 | m-Xylylenediamine, adipic acid |
| PA 6I | Hexamethylenediamine, isophthalic acid |
| PA 6-3-T | Trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | Diaminodicyclohexylmethane, laurolactam |
| PA 6I/6T/PACM | as PA 6I/6T + diaminodicyclohexylmethane |
| PA 12/MACMI | Laurolactam, dimethyldiaminodicyclohexylmethane, isophthalic acid |
| PA 12/MACMT | Laurolactam, dimethyldiaminodicyclohexylmethane, terephthalic acid |
| PA PDA-T | Phenylenediamine, terephthalic acid |

The polyamides A2) and their preparation are known, for example from Ullmanns Encyklopädie der Technischen Chemie [Ullmann's Encyclopedia of Industrial Chemistry], 4th edition, Vol. 19, pp. 39-54, Verlag Chemie, Weinheim 1980; Ullmann's Encyclopedia of Industrial Chemistry, Vol. A21, pp. 179-206, VCH Verlag, Weinheim 1992; Stoeckhert, Kunststofflexikon [Plastics Encyclopedia], 8th edition, pp. 425-428, Carl Hanser Verlag Munich 1992 (key word "Polyamide" [Polyamides] et seq.) and Saechtling, Kunststoff-Taschenbuch [Plastics Handbook], 27th edition, Carl Hanser-Verlag Munich 1998, pages 465-478.

Brief details are given below of the preparation of the preferred polyamides PA6, PA 66, and nylon-6/6,6 copolyamide. The polymerization or polycondensation of the starting monomers to give the polyamide is preferably carried out by the conventional processes. For example, caprolactam may be polymerized by the continuous processes described in DE-A 14 95 198 and DE-A 25 58 480. AH salt may be polymerized to prepare PA 66 by the conventional batch processes (see: Polymerization Processes pp. 424-467, in particular pp. 444-446, Interscience, New York, 1977), or by a continuous process, e.g. as in EP-A 129 196.

Concomitant use may be made of conventional chain regulators during the polymerization process. Examples of suitable chain regulators are triacetonediamine compounds (see WO-A 95/28443), monocarboxylic acids, such as acetic acid, propionic acid, and benzoic acid, dicarboxylic acids, such as adipic acid, sebacic acid, 1,4-cyclohexanedicarboxylic acid, isophthalic acid, and terephthalic acid, and also bases, such as hexamethylenediamine, benzylamine, and 1,4-cyclohexyldiamine.

The resultant polymer melt is discharged from the reactor, cooled, and pelletized. The resultant pellets may be subjected to a continued polymerization process, which generally takes from 2 to 24 hours. This is achieved in a manner known per se via heating of the pellets to a temperature T below the melting point $T_m$ or crystallite melting point $T_c$ of the polyamide. The continued polymerization process gives the polyamide its final molecular weight (measurable as viscosity number VN, see information concerning VN at a later stage below).

The viscosity number VN of suitable polyamides A2) is generally from 50 to 250 ml/g, preferably from 70 to 200 ml/g and particularly preferably from 90 to 170 ml/g, determined to ISO 307 EN on a 0.5% strength solution of the polyamide in 96% strength by weight sulfuric acid at 25° C. These viscosity numbers represent conventional and high molecular weights.

Reaction of Components A1) and A2) to Give the Graft Copolymer A)

The graft copolymer A) is obtainable via reaction of
A1) from 5 to 95% by weight, preferably from 10 to 90% by weight, and in particular from 15 to 85% by weight of the polymer A1), which is obtained from a dicarboxylic anhydride a11) and from vinylaromatic comonomers a12), and, if appropriate, from other comonomers a13), and
A2) from 5 to 95% by weight, preferably from 10 to 90% by weight, and in particular from 15 to 85% by weight, of the polyamide A2).

In one preferred embodiment, the amounts used of A1) and A2) are such that the molar ratio M $$M = \frac{\text{anhydride groups} - (CO) - O - (CO) - \text{in polymer } A1)}{\text{amino end groups} - NH_2 \text{ in polymer } A2)}$$

is from 3:1 to 0.7:1, preferably from 2:1 to 0.85:1.

The reaction of A1) with A2) may take place in advance in a first reaction step, by separately reacting A1) and A2) with one another. The resultant graft copolymer A) is then blended, in a second reaction step, with the other components B), and, if appropriate, C), D) and E) to give the inventive thermoplastic molding composition.

The advance reaction preferably takes place in the melt. For this, the starting materials A1) and A2) are mixed with melting, and the mixture is kept molten and, if required, mixed for a certain time which is sufficient for the chemical reaction between A1) and A2) to proceed.

Screw kneaders or other apparatus for mixing in the melt are preferably used for this purpose. Examples of suitable apparatus are single-screw kneaders, such as Co-kneaders, single-screw extruders, including those with mixing sections or shear sections, and twin-screw kneaders, such as ZSK or ZE twin-screw extruders, Kombiplast extruders, MPC twin-screw kneading mixers, FCM two-stage mixers, KEX kneading screw extruders, and sheer-roll extruders. Other useful equipment is kneaders with or without ram, trough kneaders, or Banbury mixers. Details can be found, by way of example, in Saechtling, Kunststoff-Taschenbuch [Plastics Handbook], 27th edition, Hanser Verlag Munich 1998, pp. 202-211.

The graft copolymer A) is preferably obtained via melt-compounding of the polymer A1) and of the polyamide A2).

The temperature during the reaction in the melt is from 200 to 350° C., preferably from 220 to 340° C., and in particular from 230 to 335° C. The temperature is very particularly preferably above the melting point of the polyamide A2) used by from 10 to 50° C. If amorphous polyamides A2) are used, the temperature is preferably above the glass transition temperature of the amorphous polyamide A2), determined by means of differential scanning calorimetry (DSC), by from 30 to 150° C.

The pressure is usually non-critical, and is from 2 to 100 bar absolute, for example.

The reaction times or the residence times are usually from 0.1 to 20 min, preferably from 0.2 to 15 min, and in particular from 0.3 to 10 min. Once the reaction has taken place, conventional methods are used to discharge, cool, and pelletize the melt.

As an alternative to the advance reaction in the melt, it is also possible to react A1) and A2) in advance in solution. For this, A1) and A2) are dissolved or swollen separately in suitable solvents or swelling agents, and the resultant solutions or swollen substances are reacted with one another. If there is a solvent common to A1) and A2), it is also possible to dissolve or swell A1) and A2) together. An example of a suitable solvent is halogenated alcohols, such as hexafluoroisopropanol (HFIP). Once the reaction has taken place, the solvents are removed in a conventional manner, e.g. using a vented extruder.

When this reaction is carried out in solution, the temperature is generally from 0 to 100° C., preferably from 5 to 90° C., and in particular from 10 to 80° C. The pressure is usually non-critical.

The selection of the reaction conditions for the reaction in solution is preferably such that the resultant water of reaction is removed from the reaction mixture either via chemical reaction, or physically via suitable entrainers. By way of example, concomitant use may be made of acetic anhydride for the chemical removal process.

However, the graft copolymer A) may also be formed in situ during the preparation of the inventive molding compositions, by using mixing in the melt in a mixing apparatus to react A1) and A2) and the other molding-composition components B) and, if appropriate, C), D), and E) with one another in a single reaction step. Suitable process parameters and apparatus are described in more detail below (see "Preparation of inventive molding compositions", where components A1) and A2) are to be used instead of component A)).

In one particularly preferred embodiment, the reaction of A1) and A2) is designed in such a way that at least 35 mol %, preferably at least 45 mol %, of the polyamide A2) used react with the polymer A1) to give the graft copolymer A). Simple preliminary experiments can be used to establish the required quantitative proportions, temperatures, reaction times, and other reaction conditions here. The extent of reaction can be determined by using potentiometric titration or other suitable methods to determine the number of amino end groups in the reaction product obtained from reaction of A1) and A2), or by using gel permeation chromatography or other chromatographic methods to study the reaction mixture.

Component B): Rubber

Suitable components B) for the inventive molding compositions are ungrafted or grafted, non-particulate rubbers without core-shell structure, which have functional groups which can react with the end groups of component A).

Examples of suitable functional groups are carboxylic acid groups, carboxylic anhydride groups, carboxylic ester groups, carboxamide groups, carboximide groups, amino groups, hydroxy groups, epoxy groups, urethane groups, and oxazoline groups. Examples of suitable monomers for introducing the functional groups are maleic anhydride, itaconic acid, acrylic acid, glycidyl acrylate, and glycidyl methacrylate. These monomers can be reacted with the starting rubber by methods known to the person skilled in the art, for example in the melt or in solution, if appropriate in the presence of a free-radical initiator, such as cumene hydroperoxide, and thus, by way of example, grafted onto the rubber.

Examples of suitable rubbers B) are copolymers of $\alpha$-olefins which have functional groups which can react with the end groups of component A). The $\alpha$-olefins are usually monomers having from 2 to 8 carbon atoms, preferably ethylene and propylene, in particular ethylene. Comonomers which may be used are in particular alkyl acrylate or alkyl methacrylate, where these derive from alcohols having from 1 to 8 carbon atoms, preferably from ethanol, butanol, or ethylhexanol, or else reactive comonomers, such as acrylic acid, methacrylic acid, maleic acid, maleic anhydride, or glycidyl (meth)acrylate, or else vinyl esters, in particular vinyl acetate. It is also possible to use a mixture of various comonomers. Particularly suitable materials are copolymers of ethylene with ethyl or butyl acrylate and acrylic acid and/or maleic anhydride. $\alpha$-olefin copolymers of this type are commercially available, e.g. in the form of Lupolen® KR 1270 from BASF Aktiengesellschaft.

Another preferred embodiment of these rubbers B) is provided by ethylene-propylene copolymers ("EP rubbers") which have functional groups which can react with the end groups of component A).

Particularly preferred suitable rubbers B) are those based on ethylene and octene which have functional groups which can react with the end groups of the component A). In particular, use may be made of maleic-anhydride-grafted ethylene-octene copolymers, e.g. the commercially available product Fusabond® N NM493D from DuPont.

These copolymers may be prepared in a high-pressure process at a pressure of from 400 to 4500 bar, or via grafting of the copolymers onto a poly-$\alpha$-olefin. The content of the $\alpha$-olefin in the copolymer is usually in the range from 99.95 to 55% by weight.

Other suitable rubbers B) are rubbers composed of ethylene, of propylene, and of a diene ("EPDM rubber"), see also EP-A 163 411, EP-A 244 857, where these have functional groups which can react with the end groups of component A). The EPDM rubbers used preferably comprise those whose glass transition temperature is in the range from −60 to −40° C. The EPDM rubbers have only a very low number of double bonds, i.e. fewer than twenty double bonds per 1000 carbon atoms, in particular from 3 to 10 double bonds per 1000 carbon atoms. Examples of these EPDM rubbers are terpolymers of at least 30% by weight of ethylene, at least 30% by weight of propylene, and from 0.5 to 15% by weight of an unconjugated diolefinic component. An example of a functionalized EPDM rubber which may be used is Royaltuf® 485 from Crompton.

The diene component used for EPDM rubbers is generally diolefins having at least 5 carbon atoms, e.g. 5-ethylidenenorbornene, dicyclopentadiene, 2,2,1-dicyclopentadiene, and 1,4-hexadiene. Other suitable materials are polyalkylenamer, such as polypentenamer, polyoctenamer, polydodecanamer, or a mixture of these substances. Use may also be made of partially hydrogenated polybutadiene rubbers in which at least 70% of residual double bonds have been hydrogenated.

The Mooney viscosity $ML_{1-4}$ (100° C.) of EPDM rubbers is generally from 25 to 120. They are commercially available.

Other suitable rubbers B) are those composed of vinylaromatic monomers and of dienes, e.g. styrene and butadiene or isoprene, and the dienes here may have been completely or partially hydrogenated, having functional groups which can react with the end groups of component A). By way of example, these copolymers may have a random structure, or may have a block structure composed of vinylaromatic blocks and of diene blocks, or may have a tapered structure (a gradient along the polymer chain from diene-poor to diene-rich). The copolymers may have a linear, branched, or star-shaped structure. The block copolymers may have two or more blocks, and the blocks may also be random or tapered.

Examples of suitable styrene-butadiene copolymers are styrene-butadiene two-block copolymers ("SB"), styrene-butadiene-styrene three-block copolymers ("SBS"), and in particular hydrogenated styrene-ethene/butene-styrene three-block copolymers ("SEBS"). By way of example, these copolymers composed of styrene and of dienes are available as Styrolux® or Styroflex® from BASF Aktiengesellschaft. An example of a styrene-ethene/butene block copolymer functionalized with anhydride groups is commercially available as Kraton® G 1901 FX.

The block copolymers mentioned are usually prepared via sequential anionic polymerization. In this, by way of example, styrene is first polymerized with an organolithium compound as initiator to give a styrene block, and then butadiene is added and a butadiene block is polymerized onto the styrene block, and then, if appropriate, further styrene is added and a styrene block is polymerized onto the material. Any hydrogenation of the diene blocks generally takes place catalytically under hydrogen at superatmospheric pressure.

Mixtures of various rubbers B) may, of course, also be used.

Component C): Filler or Reinforcing Material

A suitable component C) is any of the conventional particulate or fibrous fillers or reinforcing materials described in the literature, known to the person skilled in the art, and conventionally used in plastics preparation and plastics processing. Preferred component C) is glass fibers and/or talc.

Component D): Copolymer Composed of Vinylaromatic Monomers and of Comonomers

Component D) is a copolymer composed of vinylaromatic monomers d1) and of comonomers d2). These copolymers are known to the person skilled in the art and are described in the literature.

Examples of vinylaromatic monomers d1) which may be used are: styrene, α-methylstyrene, and styrenes ring-substituted by $C_{1-10}$-alkyl radicals, e.g. p-methyl-styrene, ethylstyrene, tert-butylstyrene, vinylstyrene, vinyltoluene, and also 1,2-diphenylethylene, 1,1-diphenylethylene, the vinylnaphthalenes, or a mixture of these. Preference is given to styrene, α-methylstyrene, p-methylstyrene, and vinylnaphthalene, and particular preference is given to styrene and α-methylstyrene.

Examples of suitable comonomers d2) are the monomers described above as component a13).

The comonomer d2) has preferably been selected from acrylonitrile, methacrylonitrile, methyl methacrylate, maleic anhydride, N-phenylmaleimide, and the N-alkylmaleimides. Acrylonitrile is very particularly preferred.

The copolymer D) may be rubber-free, for example SAN, or rubber-containing, for example ABS or ASA. The two embodiments are equally preferred.

The copolymer D) is obtained in a manner known per se, e.g. via bulk polymerization, solution polymerization, suspension polymerization, precipitation polymerization, or emulsion polymerization. Details of these processes are found by way of example in Kunststoffhandbuch [Plastics Handbook], Ed. Vieweg and Daumiller, Carl-Hanser-Verlag Munich, Vol. 1 (1973), pp. 37-42 and Vol. 5 (1969), pp. 118-130, and in Ullmanns Encyklopadie der technischen Chemie [Ullmann's Encyclopedia of Industrial Chemistry], 4th Edn., Verlag Chemie Weinheim, Vol. 19, pp. 107-158 "Polymerisationstechnik" [Polymerization technology].

Component E): Additives

Component E) is other additives. Additives which may be used are substances described in the literature, known to the person skilled in the art, and conventionally used in plastics preparation and plastics processing, examples being lubricants or mold-release agents, heat stabilizers (antioxidants), light stabilizers (UV stabilizers), antistatic agents, flame retardants, and also other additives, and mixtures of these.

Preparation of Thermoplastic Molding Compositions

The thermoplastic molding compositions are prepared from components A), B), and, if appropriate, C), D) and E) by mixing processes described in the prior art and known to the person skilled in the art, for example with melting in an extruder, Banbury mixer, Brabender mixer, or kneader, or on a roll mill or calender. The components here may be added as they stand, or some of them may be premixed. However, the components may also be used "cold", the melting and homogenization of the mixture composed of powder or of pellets being delayed until processing has begun.

The components may be mixed in any desired sequence. All the components may be mixed together; however, it is also possible to begin by premixing two or three of the components, and to mix this mixture with the remaining components.

Intensive and thorough mixing is advantageous in order to achieve a homogeneous mixture. The average mixing times (residence times in the mixing apparatus) advantageous for this purpose are usually from 0.2 to 30 minutes, preferably from 0.4 to 20 minutes, advantageous temperatures being from 200 to 350° C., preferably from 225 to 325° C.

The invention therefore also provides a process for preparation of the inventive thermoplastic molding composition via mixing of the components in a mixing apparatus, the average mixing time being from 0.2 to 30 min, and the temperature being from 200 to 350° C.

The components are preferably mixed in an extruder or in any other mixing apparatus at the temperatures mentioned, with melting of the thermoplastic polymer, and discharged. Use of an extruder is particularly preferred, in particular use of a corotating, closely intermeshing twin-screw extruder. The polymer discharged is cooled and comminuted, e.g. pelletized.

The inventive thermoplastic molding compositions can be used for production of moldings (among which are semifinished products), foils, fibers, or foams of any type. An example of a molding for the purposes of the invention is an injection molding or a thermoformed molding, for example for use as a household article, electrical component, medical technology device, or motor vehicle component, among these being semifinished products (panels, pipes, sheets, bars, etc.). The use mentioned and the moldings, foils, fibers, and foams are likewise provided by the invention.

The inventive molding compositions feature a balanced property profile. In particular, the notched impact resistance, and fracture energy or stiffness of the moldings produced from the molding compositions is higher than in molding compositions of the prior art.

EXAMPLES a) Starting Materials

Component A): Graft Copolymer

The following polymers A1) were prepared via thermal polymerization in ethylbenzene as solvent from the respective monomer mixtures mentioned (% by weight based in each case on the total weight of monomers used):

A1-i: 69% by weight of styrene, 29% by weight of acrylonitrile, 2% by weight of maleic anhydride
(the viscosity number of the polymer being 66 ml/g);

A1-ii: 75% by weight of styrene, 24% by weight of acrylonitrile, 1% by weight of maleic anhydride
(the viscosity number of the polymer being 65 ml/g);

A1-iii: 73% by weight of styrene, 23.5% by weight of acrylonitrile, 3.5% by weight of maleic anhydride
(the viscosity number of the polymer being 80 ml/g).

The viscosity numbers were determined on a 0.5% strength by weight solution in dimethylformamide at 25° C. to DIN 53727.

The polyamide A2) used comprised:

A2-i: Ultramid® B 3 from BASF Aktiengesellschaft, a nylon-6 obtained from ε-caprolactam with viscosity number 150 ml/g (determined on a 0.5% strength by weight solution in 96% strength by weight sulfuric acid at 25° C. to DIN 53727);

A2-ii: Ultramid® A 3 from BASF Aktiengesellschaft, a nylon-6,6, obtained from hexamethylenediammonium adipate with viscosity number 150 ml/g (determined on a 0.5% strength by weight solution in 96% strength by weight sulfuric acid at 25° C. to DIN 53727).

Component B): Rubber

The component B-i used comprised Fusabond® N NM493D, a commercially available maleic-anhydride-functionalized ethylene-octene copolymer from DuPont, (the melt flow rate MFR being 1.6 g/10 min, determined to ASTM D1238 at 190° C. melt temperature and 2.16 kg nominal load).

For comparison, a particulate graft rubber B-comp was prepared via emulsion polymerization in a manner known per se using potassium persulfate as initiator and stearate as emulsifier. It was composed of 70% by weight of a graft core composed of polybutadiene and 30% by weight of a graft shell composed of an SAN copolymer; the SAN copolymer comprised 75% by weight of styrene and 25% by weight of acrylonitrile. The weight-average particle size $d_{50}$ was 370 nm.

Component C): Filler or Reinforcing Material

The component C-i used comprised IT-Extra talc from Omya, particle diameter $d_{10}=1.7$ μm, $d_{90}=10.82$ μm, determined by means of laser scattering in a suspension cell on a talc suspension in a 1% strength by weight aqueous solution of the surfactant CV-K8 (CV-Tensidvertrieb, Hanover), talc content of suspension $1 \times 10^{-4}$ μl, pH 8.5.

Component D): Copolymer Composed of Vinylaromatic Monomers and of Comonomers

The copolymer D-i used comprised an SAN with a viscosity number of 66 ml/g (determined on a 0.5% strength by weight solution in dimethylformamide at 25° C. to DIN 53726), prepared from 75% by weight of styrene and 25% by weight of acrylonitrile by the process of continuous solution polymerization described in Kunststoff-Handbuch [Plastics Handbook], Ed. R. Vieweg and G. Daumiller, Volume V "Polystyrol" [Polystyrene], Carl-Hanser-Verlag Munich 1969, pp. 122-124.

b) Preparation and Properties of Molding Compositions

The parts by weight of components A1), A2), B), and, if appropriate, C) and D) mentioned in Table 1 were homogenized in a ZSK30 twin-screw extruder from Werner & Pfleiderer at from 240 to 290° C. and extruded into a water bath. The resultant molding compositions were pelletized and dried. These pellets were used in an injection-molding machine to produce test specimens at 260° C. melt temperature and 60° C. mold surface temperature, and the specimens were studied.

The following properties were determined:

Heat resistance as Vicat softening point on standard small specimens at a heating rate of 50 K/hour and with a force of 49.05 N, to DIN 53460, method B.

Flowability as melt volume index MVI at 240° C. melt temperature and 5 kg load to EN ISO 1133.

Notched impact resistance $a_k$ on ISO specimens at 23° C. to ISO 179/1 eA.

Notched impact resistance $a_k$ on ISO specimens at −30° C. to ISO 179/1 eA.

Fracture energy $W_s$ to ISO 6603 on sheets of thickness 3 mm at −30° C.

Stiffness as modulus of elasticity in the tensile test at a separation velocity of 1 mm/min at 23° C. to ISO 527.

Tensile strain at break in the tensile test at a separation velocity of 50 mm/min at 23° C. to ISO 527.

The parts by weight of the components from which the molding compositions were prepared are found in Table 1, as are the properties of the moldings produced from these molding compositions.

TABLE 1

Thermoplastic molding compositions: constitution and properties

| | Example | | | | | | | | | |
|---|---|---|---|---|---|---|---|---|---|---|
| | 1 | 2 | 3 | 4 | 5 | 6 | 7 | comp 8 | 9 | comp 10 |
| Constitution [parts by weight] | | | | | | | | | | |
| A1-i | 12 | 20 | 10.8 | — | — | — | — | 20 | 14.7 | 5 |
| A1-ii | — | — | — | 22 | 20.7 | 15.7 | — | — | — | — |
| A1-iii | — | — | — | — | — | — | 6.7 | — | — | — |
| A2-i | 68 | 60 | 61.2 | 63 | 59.3 | 59.3 | 78.3 | 60 | — | 41 |
| A2-ii | — | — | — | — | — | — | — | — | 65.3 | — |
| B-i | 20 | 20 | 18 | 15 | 20 | 20 | 15 | — | 20 | — |
| B-V | — | — | — | — | — | — | — | 20 | — | 35 |
| C-i | — | — | 10 | — | — | — | — | — | — | — |
| D-i | — | — | — | — | — | 5 | — | — | — | 19 |
| Properties | | | | | | | | | | |
| Vicat B [° C.] | 119 | 113 | 120 | 118 | 114 | 112 | 134 | 114 | 124 | 105 |
| MVI [ml/10 min] | 2.0 | 1.5 | 1.9 | 4.4 | 4.2 | 3.8 | 3.4 | 6.7 | 12.6* | 7.3 |
| Notched impact resistance $a_k$ [kJ/m$^2$] at 23° C. | 46 | 55 | 81 | 63 | 83 | 85 | 48 | 51 | 54 | 51 |
| Notched impact resistance $a_k$ [kJ/m$^2$] at −30° C. | 23 | 15 | 15 | 14 | 18 | 21 | 13 | 14 | 16 | 15 |
| Fracture energy $W_s$ [Nm] at −30° C. | 90 | 84 | 93 | 111 | 99 | 101 | 108 | 78 | 97 | 54 |
| Modulus of elasticity [MPa] | 2030 | 2190 | 2317 | 2315 | 2025 | 2010 | 1970 | 2020 | 2150 | 1870 |
| Tensile strain at break [%] | 160 | 161 | 145 | 168 | 148 | 141 | 178 | 145 | 157 | 87 |

Examples indicated by "comp" are comparative examples
*measured at 275° C.

The examples provide evidence of the improved mechanical properties, in particular the improved notched impact resistance, and fracture energy or stiffness of the inventive impact-modified thermoplastic molding compositions when compared with known molding compositions.

The invention claimed is:

1. A thermoplastic molding composition, comprising
    A) from 35 to 95% by weight of at least one graft copolymer A), which is obtainable via reaction of
        A1) from 5 to 95% by weight of a polymer A1), which is obtained from at least one dicarboxylic anhydride a11), from at least one vinylaromatic comonomer a12), and if appropriate from other comonomers a13), and
        A2) from 5 to 95% by weight of an aliphatic polyamide A2),
    B) from 5 to 40% by weight of at least one ungrafted or grafted, non-particulate rubber without core-shell structure B), which has functional groups which can react with the end groups of component A),
    C) from 0 to 50% by weight of at least one particulate or fibrous filler or particulate or fibrous reinforcing material C),
    D) from 0 to 60% by weight of at least one copolymer D) composed of vinylaromatic monomers d1) and of comonomers d2), and
    E) from 0 to 40% by weight of at least one other additive E),
    where the entirety of components A) to E) gives 100% by weight, and
    wherein the rubber B) is based on ethylene and octane and has functional groups which can react with the end groups of the graft copolymer A).

2. The molding composition according to claim 1, wherein the dicarboxylic anhydride a11) has been selected from maleic anhydride, methylmaleic anhydride, and itaconic anhydride.

3. The molding composition according to claim 1 wherein the vinylaromatic comonomer a12) has been selected from styrene, α-methylstyrene, p-methyl-styrene, and vinylnaphthalene.

4. The molding composition according to claim 1 wherein the other comonomers a13) are acrylonitrile, methacrylonitrile, methyl methacrylate, N-phenylmaleimide, or N-alkylmaleimides.

5. The molding composition according to claim 1 wherein the polymer A1) comprises from 0.5 to 10% by weight of the dicarboxylic anhydrides a11), from 42 to 85.5% by weight of the vinylaromatic comonomers a12), and from 14 to 38% by weight of the other comonomers a13)
    where the entirety of the components a11), a12) and a13) gives a total of 100% by weight.

6. The molding composition according to claim 1 wherein the polymer A1) is obtainable from the following monomers
    styrene and maleic anhydride,
    styrene, α-methylstyrene and maleic anhydride,
    styrene, acrylonitrile, and maleic anhydride, or
    styrene, N-phenylmaleimide, and maleic anhydride.

7. The molding composition according to claim 1 wherein the aliphatic polyamide A2) has been selected from the group consisting of nylon-6, nylon-6,6, and the copolyamide nylon 6/6,6.

8. The molding composition according to claim 1 wherein the amounts used of A1) and A2) are such that the molar ratio of anhydride groups in polymer A1 to the amino end groups in polymer A2 is from 3:1 to 0.7:1.

9. The molding composition according to claim 1 wherein the amounts used of A1) and A2) are such that the molar ratio of anhydride groups in polymer A1 to the amino end groups in polymer A2 is from 2:1 to 0.85:1.

10. The molding composition according to claim 1 wherein the rubber B) has been selected from the group consisting of ethylene copolymers, ethylene-propylene copolymers, ethylene-propylene-diene copolymers, styrene-butadiene block copolymers, and ethylene-octene copolymers, and has functional groups which can react with the end groups of component A).

11. The molding composition according to claim 1 wherein the rubber B) is composed of ethylene-propylene copolymers and has functional groups which can react with the end groups of component A).

12. A process for preparation of the thermoplastic molding compositions according to claim 1 which comprises, in a first step, reacting the polymer A1) with the polyamide A2) via mixing of melts or reaction in solution to give the graft copolymer A), and, in a second step, mixing this component A) with components B) and, if appropriate, C) to E) in a mixing apparatus.

13. A process for preparation of the thermoplastic molding compositions according to claim 1 which comprises, in one step, reacting the polymer A1) and the polyamide A2) with components B) and, if appropriate, C) to E) via mixing of melts in a mixing apparatus.

14. The process for preparation of the thermoplastic molding compositions according to claim 1 wherein at least 35 mol % of the polyamide A2) used react with the polymer A1) to give the graft copolymer A).

15. The process for preparation of the thermoplastic molding compositions according to claim 1 wherein at least 45 mol % of the polyamide A2) used react with the polymer A1) to give the graft copolymer A).

16. A molding, a foil, a fiber, or a foam obtainable from the thermoplastic molding compositions according to claim 1.

* * * * *